United States Patent
Kitamura et al.

(10) Patent No.: US 11,192,574 B2
(45) Date of Patent: Dec. 7, 2021

(54) STEERING DEVICE

(71) Applicant: HITACHI AUTOMOTIVE SYSTEMS, LTD., Hitachinaka (JP)

(72) Inventors: Keisuke Kitamura, Atsugi (JP); Norihiro Kimura, Atsugi (JP); Osamu Yoshida, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 30 days.

(21) Appl. No.: 16/634,264

(22) PCT Filed: Jul. 2, 2018

(86) PCT No.: PCT/JP2018/024991
§ 371 (c)(1),
(2) Date: Jan. 27, 2020

(87) PCT Pub. No.: WO2019/031100
PCT Pub. Date: Feb. 14, 2019

(65) Prior Publication Data
US 2021/0086819 A1 Mar. 25, 2021

(30) Foreign Application Priority Data
Aug. 10, 2017 (JP) .............................. JP2017-154967

(51) Int. Cl.
*B62D 3/12* (2006.01)
(52) U.S. Cl.
CPC .................... *B62D 3/126* (2013.01)
(58) Field of Classification Search
CPC ........... B62D 3/12; B62D 3/126; B62D 7/228
See application file for complete search history.

(56) References Cited

U.S. PATENT DOCUMENTS

| 4,709,591 A | * | 12/1987 | Emori | ................... | B62D 3/12 |
| | | | | | 74/422 |
| 9,302,698 B2 | * | 4/2016 | Enomoto | ................ | F16F 1/376 |

(Continued)

FOREIGN PATENT DOCUMENTS

| GB | 2524626 A | * | 9/2015 | ............. B62D 3/126 |
| JP | 2015-182713 A | | 10/2015 | |

(Continued)

OTHER PUBLICATIONS

International Search Report issued in corresponding application No. PCT/JP2018/024991 dated Sep. 25, 2018 with English translation.

(Continued)

*Primary Examiner* — Paul N Dickson
*Assistant Examiner* — Scott F. Underwood
(74) *Attorney, Agent, or Firm* — Foley & Lardner LLP

(57) ABSTRACT

A rack housing (9) is provided with: a cylindrical main body (19) for movably accommodating a rack bar (8); and a stroke limiting section (25) annularly protruding from the cylindrical main body (19) toward a first end (9a). The inner peripheral surface (25b) of the stroke limiting section (25) is located offset radially outward from a support surface (19a), i.e. the inner peripheral surface of the cylindrical main body (19). The inner peripheral surface (25b) and the support surface (19a) are connected to each other by a sloped section (26) which is sloped circular conically. The sloped section (26) is provided at a position overlapping the cylindrical main body (19) when viewed radially. The sloped section (26) is sloped so that the inner diameter of the cylindrical main body (19) of the rack housing (9) increases toward a first contact section (25a).

9 Claims, 9 Drawing Sheets

(56) References Cited

U.S. PATENT DOCUMENTS

2015/0158520 A1* 6/2015 Watanabe ............... F16F 7/095
    280/93.514
2018/0334187 A1* 11/2018 Kato ....................... B62D 3/12

FOREIGN PATENT DOCUMENTS

JP   6242549 B1 * 12/2017 ............... B62D 3/12
JP   2019048493 A * 3/2019

OTHER PUBLICATIONS

Written Opinion of the International Searching Authority issued in corresponding application No. PCT/JP2018/024991 dated Sep. 25, 2018 with English translation.

* cited by examiner

STEERING DEVICE

BACKGROUND

The present disclosure relates to a steering device.

JP 2015-182713 A (patent document 1), corresponding to U.S. Pat. No. 9,302,698 B2 discloses a known steering device.

The steering device according to patent document 1 includes a rack housing composed of a tubular body portion and a stroke restricting portion, wherein the stroke restricting portion projects from the tubular body portion, and restricts movement of a ball joint. The tubular body portion and the stroke restricting portion are equal in inner diameter to each other.

SUMMARY

In the steering device according to patent document 1, when a rack bar in the tubular body portion is deflected in a radial direction of the tubular body portion by an external input, the rack bar is brought into contact with an inner peripheral surface of the stroke restricting portion. This may cause a tensile stress to be applied to an outer peripheral edge portion of the stroke restricting portion, thereby damaging the outer peripheral edge portion.

The present disclosure has been made in view of conventional circumstances, and is targeted for providing a steering device capable of suppressing a stroke restricting portion of a rack housing from being damaged.

According to one aspect of the present disclosure, a stroke restricting portion has an inner diameter greater than a minimum value of inner diameter of a tubular body portion.

According to the present disclosure, the stroke restricting portion of the rack housing is suppressed from being damaged.

DETAILED DESCRIPTION

The following describes steering devices according to embodiments of the present disclosure with reference to the drawings.

Figure 1:
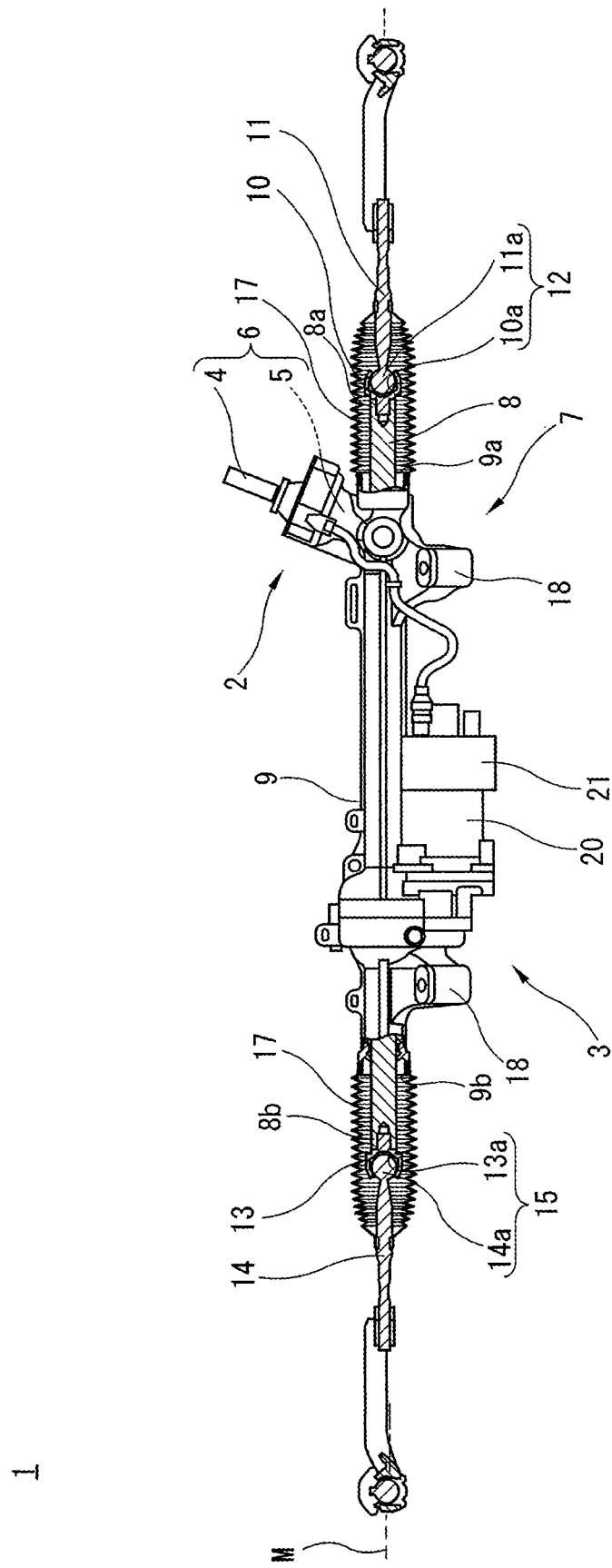
FIG. 1 is a schematic view of a steering device according to a first embodiment.

<First Embodiment> (Configuration of Steering Device)
FIG. 1 is a schematic view of a steering device 1 according to a first embodiment, showing a part of steering device 1 in cross section.

As shown in FIG. 1, steering device 1 includes: a steering mechanism 2 structured to transmit a steering force from a driver; and a steering assist mechanism 3 structured to assist steering operation of the driver.

Steering mechanism 2 provides mechanical connection between a steering wheel not shown disposed in a driver compartment of a vehicle and two steered wheels not shown that are front wheels of the vehicle. Steering mechanism 2 includes a steering shaft 6 and a transmission mechanism 7, wherein steering shaft 6 includes an input shaft 4 and an output shaft 5. Input shaft 4 is structured to receive input of a torque from the steering wheel. Output shaft 5 is connected to input shaft 4 via a torsion bar not shown. Transmission mechanism 7 is structured to transmit rotation of steering shaft 6 to the steered wheels. Transmission mechanism 7 is based on a rack and pinion mechanism (rack and pinion gear), including a pinion not shown provided on an outer periphery of output shaft 5, and a rack not shown provided on an outer periphery of a rack bar 8.

Rack bar 8 is movably accommodated in a rack housing 9 having a slender tubular shape.

Rack bar 8 has an end portion 8a closer to steering mechanism 2, wherein a first rack end 10 is fixed to end portion 8a of rack bar 8 by meshing between an external thread portion of first rack end 10 and an internal thread portion of end portion 8a. At end portion 8a of rack bar 8, first rack end 10 includes a recess 10a in a circular arc shape, wherein a spherical end portion 11a of a first tie rod 11 is fitted in recess 10a. The combination of recess 10a and spherical end portion 11a forms a first ball joint 12, wherein rack bar 8 is connected to first tie rod 11 via first ball joint 12.

Similarly, rack bar 8 has an end portion 8b farther from steering mechanism 2, wherein a second rack end 13 is fixed to end portion 8b of rack bar 8 by meshing between an external thread portion of second rack end 13 and an internal thread portion of end portion 8b. At end portion 8b of rack bar 8, second rack end 13 includes a recess 13a in a circular arc shape, wherein a spherical end portion 14a of a second tie rod 14 is fitted in recess 13a. The combination of recess 13a and spherical end portion 14a forms a second ball joint 15, wherein rack bar 8 is connected to second tie rod 14 via second ball joint 15.

Each of first tie rod 11 and second tie rod 14 is connected to a corresponding one of the steered wheels via a knuckle arm not shown.

Each of axial ends of rack housing 9 is provided with a cushioning member 16 described below (see FIG. 3) for cushioning an impact due to collision between first rack end 10 and rack housing 9, or between second rack end 13 and rack housing 9.

Each of the axial ends of rack housing 9 is further provided with a bellows-like boot 17 structured to cover an outer periphery of first ball joint 12 or second ball joint 15. Boot 17 is made of an elastic material such as a synthetic rubber material so as to ensure a predetermined flexibility, and prevent intrusion of water, dust, etc. into rack bar 8 and others.

Each of the axial ends of rack housing 9 is further provided with a mount bracket 18 for mounting the rack housing 9 to a vehicle body. Mounting brackets 18 is provided with a rubber bushing not shown via which rack housing 9 is attached to the vehicle body.

For convenience of the following description, a reference axis M is defined as an axis that is parallel to a direction of travel of rack bar 8 with respect to rack housing 9, and passes through a center of a circle in a cross-sectional plane perpendicular to the direction of travel of rack bar 8, wherein the circle is defined by an inner peripheral surface of a tubular body portion 19 described below (see FIG. 2) of rack housing 9. Furthermore, an axial direction is defined as a direction parallel to reference axis M. Moreover, a radial direction with respect to reference axis M is defined as a direction perpendicular to reference axis M.

Steering assist mechanism 3 includes a motor 20 that is an electric motor structured to apply a steering force to steering mechanism 2. Motor 20 is formed integrally with an electronic control unit (ECU) 21.

Electronic control unit 21 has a function of storing and executing various control processes, and drives and controls motor 20 based on signals including a signal of steering torque from a torque sensor not shown.

In steering device 1 thus configured, when the steering wheel is rotated by a driver, input shaft 4 rotates and twists the torsion bar, and the torsion bar causes an elastic force, thereby rotating the output shaft 5. The rotation of output shaft 5 is converted into a linear motion in the axial direction of rack bar 8 by the rack and pinion mechanism, to push and pull the knuckle arms not shown in a vehicle lateral direction via tie rods 11, 14, and thereby change the attitude of the corresponding steered wheels.

Figure 2:
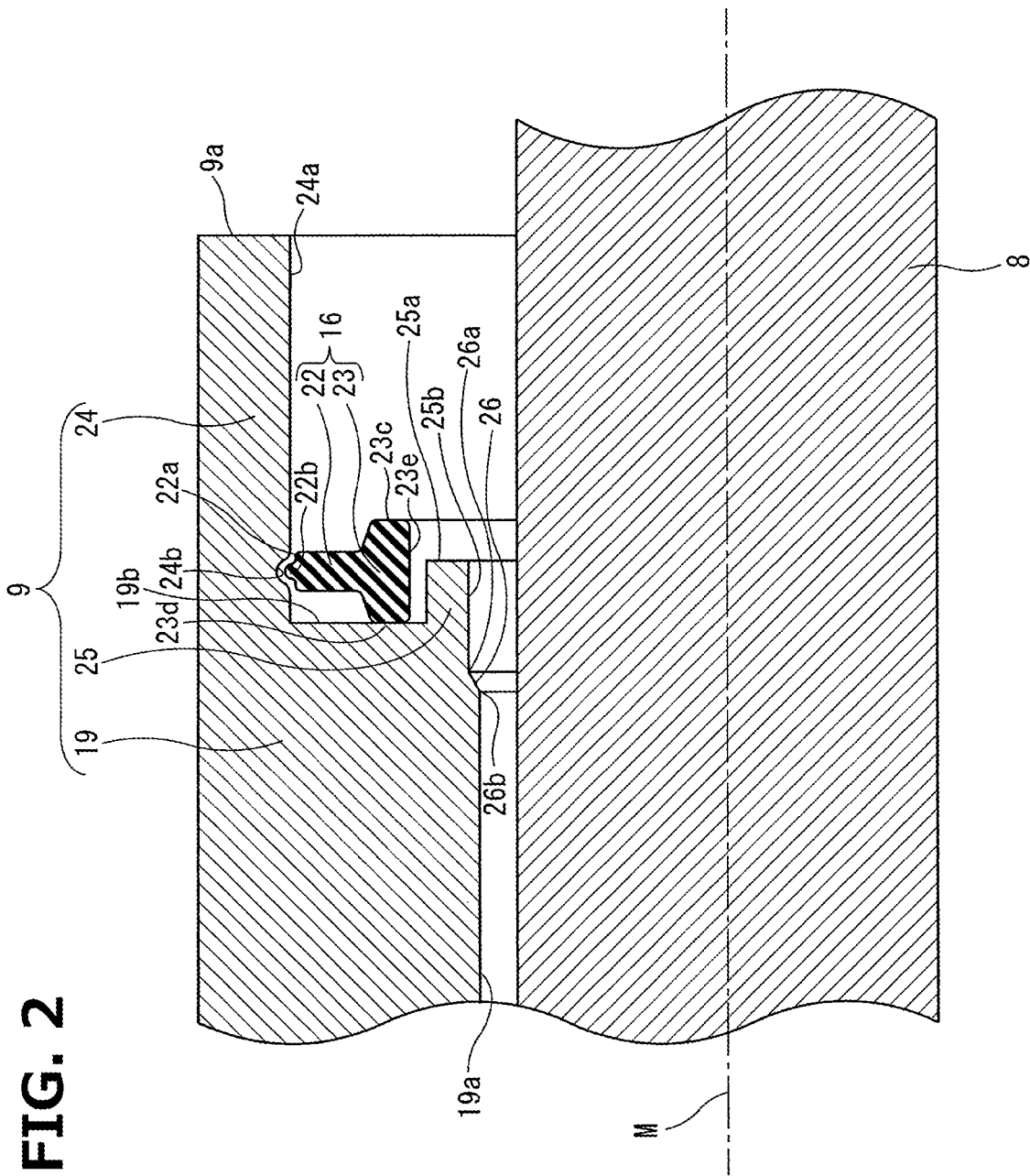
FIG. 2 is an enlarged sectional view of a rack bar and a rack housing according to the first embodiment at its first end.

FIG. 2 is an enlarged sectional view of rack bar 8 and rack housing 9 according to the first embodiment at its the first end 9a.

Rack housing 9 has a slender tubular shape including the first end 9a closer to steering mechanism 2 (see FIG. 1), and a second end 9b farther from steering mechanism 2 (see FIG. 1). Rack housing 9 includes: tubular body portion 19 inside which rack bar 8 travels; a cushioning member accommodating portion 24 formed integrally with tubular body portion 19; and a stroke restricting portion 25 also formed integrally with tubular body portion 19. Rack housing 9 is formed by pouring a metallic material into a single casting mold such that tubular body portion 19, cushioning member accommodating portion 24, and stroke restricting portion 25 are integrally formed by casting, wherein an inner peripheral surface 25b described below is thereafter machined in stroke restricting portion 25. Therefore, tubular body 19 includes a supporting surface 19a and an inclined portion 26 described below in which casting surfaces remain.

Tubular body portion 19 has a slender tubular shape, and includes a supporting surface 19a that is an inner peripheral surface for supporting the rack bar 8 directly. Although rack bar 8 is supported by supporting surface 19a in the present embodiment, rack bar 8 is not limited to this configuration, but may be movably supported via a rack bushing in tubular body portion 19.

Cushioning member accommodating portion 24 is disposed closer to first end 9a than tubular body 19 in the axial direction, and outside the rack bar 8 in the radial direction, and has a recessed shape opening toward first end 9a in the axial direction. Namely, cushioning member accommodating portion 24 is located at an outer periphery side of tubular body portion 19, and has a tubular shape projecting from an end 19b of tubular body portion 19 toward first rack end 10 (see FIG. 1) and opening toward first rack end 10. Cushioning member accommodating portion 24 includes an inner peripheral surface 24a including a cushioning member holding portion 24b that is closer to end 19b of tubular body portion 19, is an annular groove open toward rack bar 8. Cushioning member holding portion 24b has a larger outer diameter than an annular protrusion 22b of a base portion 22 described below of cushioning member 16.

When cushioning member 16 is mounted in uncompressed state inside the cushioning member housing portion 24, a protrusion 22b of base portion 22 is held by cushioning member holding portion 24b with some clearances remaining between protrusion 22b and cushioning member holding portion 24b and between an outer peripheral surface 22a and inner peripheral surface 24a, as shown in FIG. 2. In this state, an end surface 23d of a cushioning portion 23 described below of cushioning member 16 is in contact with end surface 19b of tubular body portion 19, and an inner peripheral surface 23e of cushioning portion 23 is spaced apart from stroke restricting portion 25.

On the other hand, when first rack end 10 (see FIG. 1) collides with an end surface 23c of cushioning portion 23 described below, cushioning portion 23 is compressed and deformed between first rack end 10 and tubular body 19 in the axial direction, and base portion 22 is compressed and brought into press contact with cushioning member holding portion 24b. Namely, when cushioning member 16 is compressed and deformed, protrusion 22b is brought into intimate contact with cushioning member holding portion 24b, and outer peripheral surface 22a is also brought into intimate contact with inner peripheral surface 24a.

Stroke restricting portion 25 is located at an inner peripheral side of tubular body portion 19, and closer to first end 9a than tubular body portion 19, and projects annularly toward the first end 9a. In other words, stroke restricting portion 25 is located at the inner peripheral side of tubular body portion 19, and inside the cushioning member accommodating portion 24 in the radial direction, and projects annularly from end 19b of tubular body 19 toward the first end 9a. The length of projection of stroke restricting portion 25 is shorter than that of cushioning member accommodating portion 24. Stroke restricting portion 25 overlaps with cushioning member accommodating portion 24 in the axial direction. Namely, stroke restricting portion 25 faces cushioning member accommodating portion 24 in the radial direction.

Furthermore, stroke restricting portion 25 includes a first contact portion 25a at its tip, which is an annular surface structured to be in contact with first rack end 10 when stroke restricting portion 25 collides with first rack end 10. First contact portion 25a serves to restrict movement of first rack end 10 toward tubular body portion 19 at the time of collision of the first rack end 10. When cushioning member 16 attached to rack housing 9 is in uncompressed state, end surface 23c of cushioning portion 23 described below of cushioning member 16 is located closer to first end 9a than first contact portion 25a in the axial direction.

Inner peripheral surface 25b of stroke restricting portion 25 is located with a radially outward offset from supporting surface 19a tubular body portion 19 that is an inner peripheral surface of tubular body portion 19. Namely, the inner diameter of stroke restricting portion 25 is larger than a minimum inner diameter of supporting surface 19a of tubular body portion 19. For example, if supporting surface 19a is step-shaped, the inner diameter of supporting surface 19a continuous in the tubular shape may contain a part whose inner diameter is greater than the inner diameter of stroke restricting portion 25, but such a part is excluded from the comparison.

Furthermore, inner peripheral surface 25b is formed to extend from first contact portion 25a through the end 19b of tubular body portion 19 into tubular body portion 19, straddling a boundary between stroke restricting portion 25 and tubular body portion 19. Inner peripheral surface 25b and supporting surface 19a are connected to each other by an inclined portion 26 that is inclined conically and shaped such that the inner diameter of tubular body 19 increases toward first contact portion 25a.

Furthermore, since only inner peripheral surface 25b of stroke restricting portion 25 is machined after casting during formation of rack housing 9 as described above, inclined portion 26 contains a casting surface as well as supporting surface 19a that is a casting surface. Incidentally, the casting surface of inclined portion 26 may remain on the entire inclined portion 26, or may remain on a part of inclined portion 26. Inclined portion 26 is formed to overlap with tubular body portion 19 in the axial direction. In other words, inclined portion 26 extends in a region of tubular body portion 19 in the axial direction. Inclined portion 26 has an end 26a closer to first end 9a rack housing 9 in the axial direction, and an end 26b farther from first end 9a.

Although FIG. 2 illustrates a first section of rack housing 9 closer to first end 9a, a second section of rack housing 9 closer to second end 9b is structured similarly to the first section.

Figure 3:
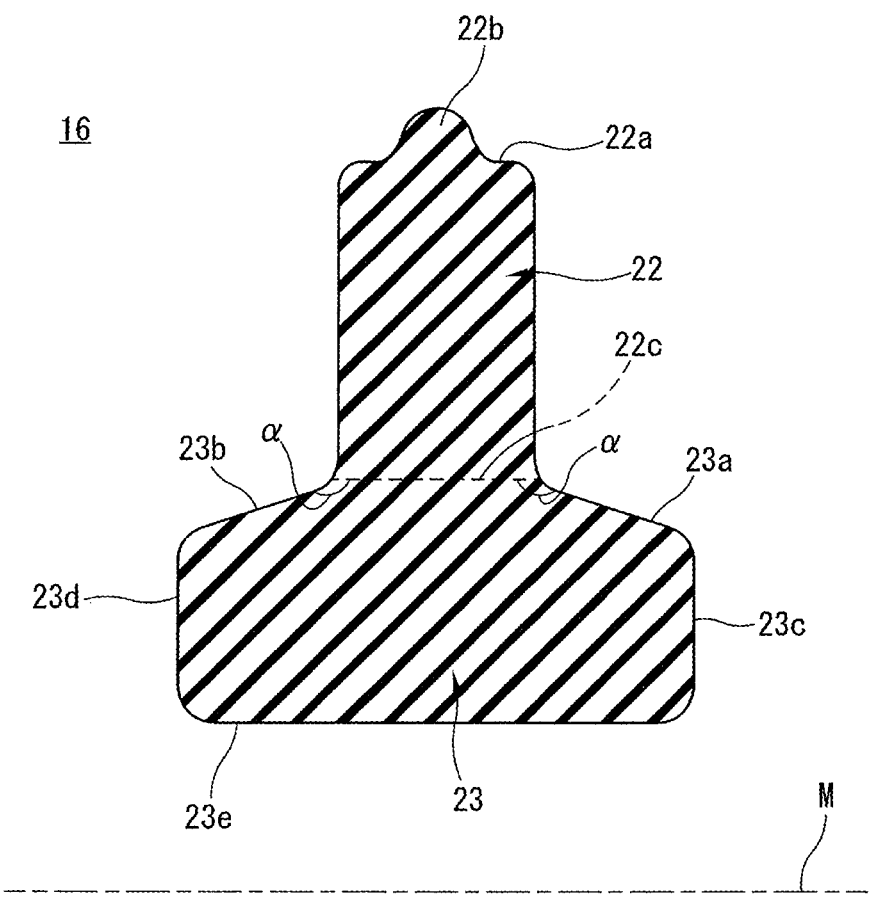
FIG. 3 is a cross-sectional view of a cushioning member taken along a plane containing a reference axis.

(Structure of Cushioning Member) FIG. 3 is a cross-sectional view of cushioning member 16 taken along a plane containing the reference axis M. Cushioning member 16 is formed annularly in actuality, but only the cross-sectional view is shown for convenience of explanation.

Cushioning member 16 is made of an elastic material, and includes base portion 22 and cushioning portion 23, wherein base portion 22 is formed annularly to encompass the reference axis M, and wherein cushioning portion 23 is formed annularly and integrally with base portion 22, and located inside the base portion 22 in the radial direction.

Base portion 22 has a substantially rectangular shape in the cross-sectional view taken along the plane containing the reference axis M, and is arranged such that the long side of base portion 22 extends in the radial direction as shown in FIG. 3. Base portion 22 includes annular protrusion 22b that protrudes outward from outer peripheral surface 22a of base portion 22, wherein protrusion 22b is located at a midpoint of outer peripheral surface 22a in the axial direction. Protrusion 22b has a substantially semicircular shape in the cross-sectional view taken along the plane containing the reference axis M.

Cushioning portion 23 has a substantially rectangular shape in the cross-sectional view taken along the plane containing the reference axis M, and is arranged such that the long side of cushioning portion 23 extends in the axial direction. Cushioning portion 23 has a greater dimension in the axial direction than base portion 22. Cushioning portion 23 is formed such that in the cross-sectional view taken along the plane containing the reference axis M, a minor angle α between each of radially outward surfaces 23a, 23b of cushioning portion 23 and axial end surface 22c of base portion 22 (shown by a broken line in FIG. 3) is an obtuse angle. Namely, radially outer surfaces 23a, 23b of cushioning portion 23 are inclined at minor angle α toward the reference axis M so as to be symmetrical in the axial direction about base portion 22.

Furthermore, cushioning portion 23 includes end surface 23c and end surface 23d, wherein end surface 23c is structured to be in contact with first rack end 10 when cushioning portion 23 collides with first rack end 10, and wherein end surface 23d is structured to be in contact with end 19b of tubular body 19 (see FIG. 2) when cushioning member 16 attached to rack housing 9 is uncompressed state. In cushioning portion 23, surface 23a and end surface 23c are connected together in an arc shape, and surface 23b and end surface 23d are connected together in an arc shape. Similarly, end surface 23c and inner peripheral surface 23e are connected together in an arc shape, and end surface 23d and inner peripheral surface 23e are connected together in an arc shape.

Furthermore, at the time of collision of second rack end 13, second rack end 13 collides with end surface 23d of cushioning portion 23.

End surface 23c serves as a second contact portion.

Figure 4:
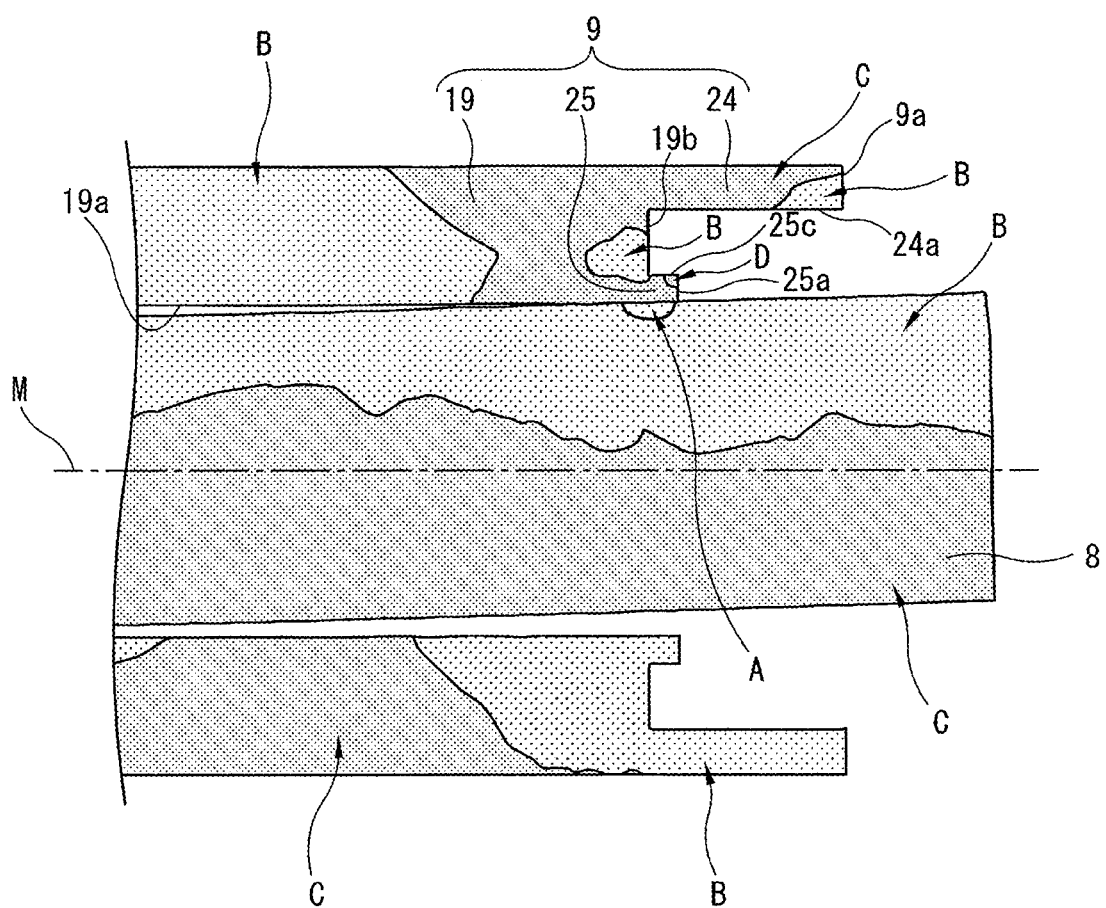
FIG. 4 is a diagram showing a result of simulation of load distribution applied to a rack bar and a rack housing according to a comparative example.

<Effects of First Embodiment> FIG. 4 shows a result of simulation of load distribution applied to a rack bar 8 and a rack housing 9 according to a comparative example, when rack bar 8 is deflected in the radial direction to contact the stroke restricting portion 25, wherein rack housing 9 according to the comparative example is shaped as the rack housing of patent document 1.

In FIG. 4, the magnitude of the load applied to rack bar 8 and rack housing 9 is shown by a low load region A, a medium load region B indicated by denser dots than low load region A, a high load region C indicated by denser dots than medium load region B, and a maximum load region D indicated by denser dots than high load region C.

As shown in FIG. 4, when rack bar 8 is deflected in the radial direction to contact the inner peripheral surface of stroke restricting portion 25, tensile stress acts on outer peripheral edge portion 25c of stroke restricting portion 25, so that maximum load region D where the load is the highest is present in outer peripheral edge portion 25c. The tensile stress applied to maximum load region D is a factor to cause cracks in outer peripheral edge portion 25c. The portion of stroke restricting portion 25 except outer peripheral edge portion 25c is in high load region C lower in load than maximum load region D.

Figure 5:
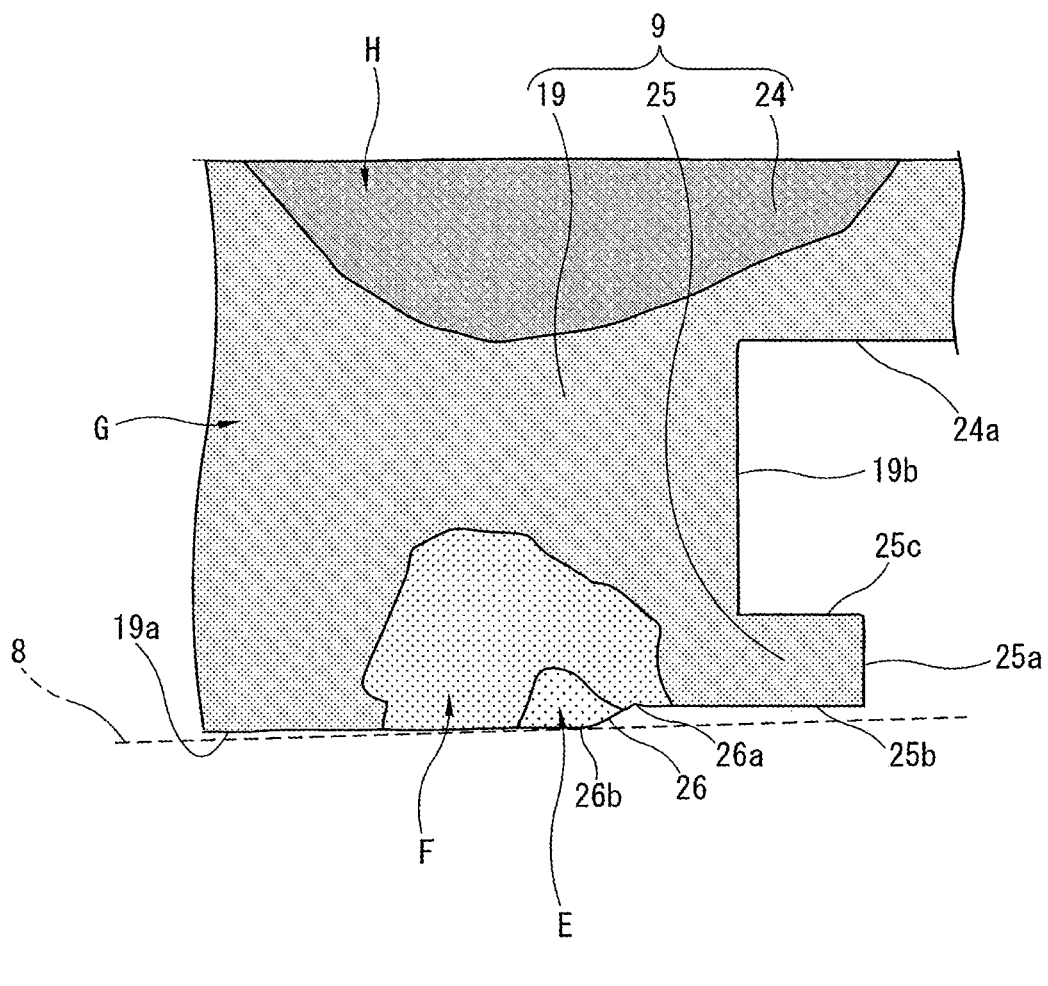
FIG. 5 is a diagram showing a result of simulation of load distribution applied to the rack bar and the rack housing according to the first embodiment.

FIG. 5 shows a result of simulation of load distribution applied to rack bar 8 and rack housing 9 according to the first embodiment, when rack bar 8 is deflected in the radial direction to contact the tubular body portion 19. In FIG. 5, rack bar 8 is indicated by broken lines.

In FIG. 5, the magnitude of the load applied to rack housing 9 is shown by a low load region E, a medium load region F indicated by denser dots than low load region E, a high load region G indicated by denser dots than medium load region F, and a maximum load region H indicated by denser dots than high load region G.

As shown in FIG. 5, when the rack bar 8 is deflected in the radial direction, rack bar 8 contacts the end 26b of inclined portion 26 that is formed in supporting surface 19a of tubular body portion 19, but is maintained out of contact with inner peripheral surface 25b of stroke restricting portion 25 located radially outside the end 26b of inclined portion 26. Therefore, no excessive load is inputted to stroke restricting portion 25, wherein only high load region G lower in load than maximum load region H is present in stroke restricting portion 25.

In the first embodiment, steering device 1 includes: rack bar 8 connected to the pair of ball joints, wherein the pair of ball joints include first ball joint 12 and second ball joint 15; rack housing 9 made of metal, and including tubular body portion 19, cushioning member accommodating portion 24, stroke restricting portion 25, and the pair of ends, wherein the pair of ends include first end 9a and second end 9b, wherein: tubular body portion 19 is structured to support rack bar 8 in the manner to allow rack bar 8 to travel; with reference to reference axis M that is parallel to the direction of travel of rack bar 8 with respect to rack housing 9, and passes through the center of the circle in the cross-sectional plane perpendicular to the direction of travel of rack bar 8, wherein the circle is defined by the inner peripheral surface of tubular body portion 19, cushioning member accommodating portion 24 is disposed to be closer to first end 9a than tubular body portion 19 along reference axis M, and be outside the rack bar 8 in the radial direction with respect to reference axis M, and has the recessed shape opening to first end 9a along reference axis M; stroke restricting portion 25 is disposed inside the cushioning member accommodating portion 24 in the radial direction with respect to reference axis M; along reference axis M, stroke restricting portion 25 overlaps with cushioning member accommodating portion 24, and is closer to first end 9a than tubular body portion 19, and projects toward first end 9a, and includes first contact portion 25a structured to be in contact with first ball joint 12; and stroke restricting portion 25 has an inner diameter as a dimension in the radial direction with respect to reference axis M, wherein the inner diameter is greater than the minimum value of inner diameter of tubular body portion 19 as a dimension in the radial direction with respect to reference axis M; and cushioning member 16 disposed at cushioning member accommodating portion 24, and made of an elastic material, and including the cushioning portion 23, wherein: cushioning member 16 is structured to be compressed between tubular body portion 19 and first ball joint 12, and includes end surface 23c structured to be in contact with first ball joint 12; and end surface 23c is closer to first end 9a than first contact portion 25a along reference axis M.

The feature of offsetting the inner peripheral surface 25b of stroke restricting portion 25 radially outward, serves to suppress hard contact of rack bar 8 with inner peripheral surface 25b when rack bar 8 is deflected in the radial direction. As compared to rack housing 9 according to the comparative example, this serves to set the load distribution of stroke restricting portion 25 in rack housing 9 according to the first embodiment such that only high load region G is present where the load is not locally applied, as shown in FIG. 5. This serves to suppress excessive tensile stress to outer peripheral edge portion 25c of stroke restricting portion 25, and thereby reduce the possibility of cracks in outer peripheral edge portion 25c.

Furthermore, in the first embodiment: rack housing 9 is a casting formed by casting; and inclined portion 26 has a casting surface.

When the inner peripheral surface of tubular body portion 19 is machined, it is sufficient to cut the supporting surface 19a of tubular body 19 by machining, wherein supporting surface 19a has the minimum inner diameter in tubular body 19, and it is not required to machine the casting surface of inclined portion 26. This serves to reduce the area that is to be machined, and improve the efficiency of production of rack housing 9.

Furthermore, in the first embodiment: rack housing 9 is a casting formed by casting; and cushioning member accommodating portion 24, stroke restricting portion 25, and inclined portion 26 are of an article integrally formed with a single casting mold.

If cushioning member accommodating portion 24, stroke restricting portion 25, and inclined portion 26 are formed individually by split molds, the relative positional accuracy of these components may be lowered due to the relative positional accuracy of the split molds.

In contrast, the feature that these components are formed by a single casting mold (including a core), serves to maintain the relative positional accuracy of these components high. This serves to maintain high the positional accuracy of inclined portion 26 with respect to cushioning member accommodating portion 24 and stroke restricting portion 25, specifically, the positional accuracy of end 26b of inclined portion 26 that contacts rack bar 8 when rack bar 8 is deflected in the radial direction. In other words, it serves to suppress end 26b of inclined portion 26 from deviating toward first end 9a with respect to cushioning member accommodating portion 24 and stroke restricting portions 25 due to manufacturing errors. This serves to suppress stroke restricting portion 25 from receiving an excessive load when rack bar 8 contacts end 26b of inclined portion 26, and thereby prevent cracks in outer peripheral edge portion 25c of stroke restricting portion 25.

Furthermore, in the first embodiment, rack housing 9 includes the inner peripheral surface including the supporting surface 19a structured to support the rack bar 8 directly.

The feature that supporting surface 19a is structured to support the rack bar 8 directly without provision of a rack bushing, serves to reduce the number of parts of steering device 1, and also reduce the manufacturing cost of steering device 1.

Furthermore, with no rack bushing, the distance in the radial direction between rack bar 8 and stroke restricting portion 25 is shorter as compared to a structure provided with a rack bushing, and there is a higher possibility that when rack bar 8 is deflected, rack bar 8 contacts inner peripheral surface 25b of stroke restricting portion 25 hard. However, the feature of the first embodiment that inner peripheral surface 25b of stroke restricting portion 25 is offset radially outward, serves to suppress rack bar 8 from contacting hard the inner peripheral surface 25b of stroke restricting portion 25. This serves to effectively suppress cracks in outer peripheral edge portion 25c of stroke restricting portion 25.

Figure 6:
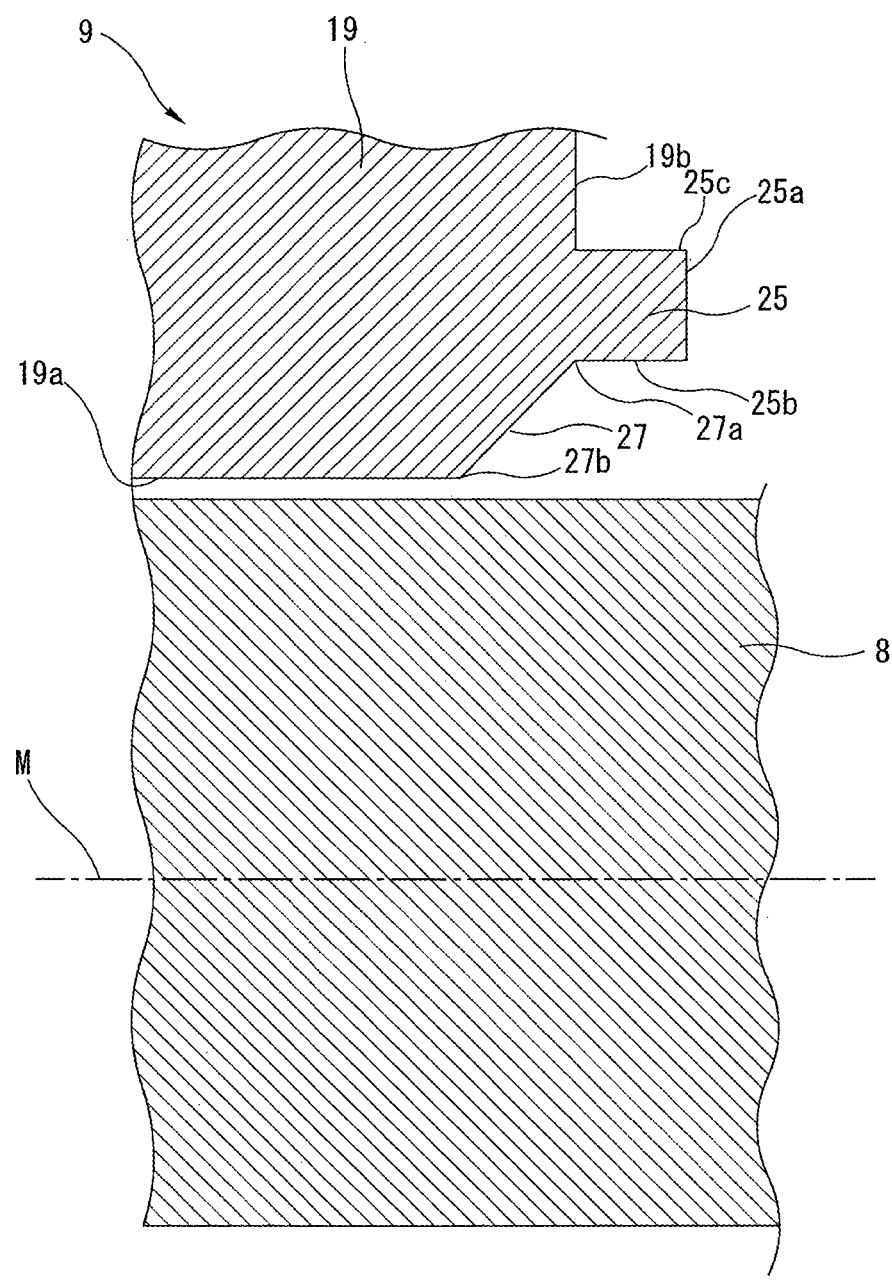
FIG. 6 is an enlarged sectional view of a rack bar and a rack housing according to a second embodiment at its first end.

<Second Embodiment> FIG. 6 is an enlarged sectional view of rack bar 8 and rack housing 9 according to a second embodiment at first end 9a (see FIG. 1).

In the second embodiment, inclined portion 26 according to the first embodiment is replaced with a different inclined portion 27. Inclined portion 27 is inclined conically, and includes a pair of ends in the axial direction, wherein the pair of ends include an end 27a located to be closer to first end 9a, and an end 27b located to be farther from first end 9a. End 27a corresponds in position in the axial direction to end 19b of tubular body portion 19. On the other hand, end 27b is located to overlap with tubular body portion 19 in the axial direction. Namely, end 27b is in a region of tubular body 19 in the axial direction. Inclined portion 27 is formed in a region from tubular body portion 19 to stroke restricting portion 25 in the axial direction such that the inner diameter of tubular body portion 19 of rack housing 9 that is a dimension in the radial direction increases gradually toward first contact portion 25a.

By connecting the inner peripheral surface 25b and the supporting surface 19a through the inclined portion 27, inner peripheral surface 25b of stroke restricting portion 25 is offset radially outwardly from supporting surface 19a of tubular body portion 19.

Inclined portion 27 may be provided in inner peripheral surface 25b of stroke restricting portions 25, or may be provided to extend in both of supporting surface 19a of tubular body 19 and inner peripheral surface 25b of stroke restricting portion 25.

<Effects of Second Embodiment> In the second embodiment: rack housing 9 includes inclined portion 27; and inclined portion 27 is formed in the region from tubular body portion 19 to stroke restricting portion 25 along reference axis M such that the inner diameter of rack housing 9 that is a dimension in the radial direction with respect to reference axis M increases gradually toward first contact portion 25a.

If rack housing 9 includes a stepped portion instead of inclined portion 27, when rack bar 8 is deflected in the radial direction, rack bar 8 contacts hard a corner of the step portion, wherein the contact pressure at the corner becomes high.

In contrast, the feature of the second embodiment that inner peripheral surface 25b is offset radially outward by inclined portion 27, serves to suppress stroke restricting portion 25 and rack bar 8 from locally contacting each other, and thereby reduce the contact pressure therebetween.

Furthermore, in the second embodiment: inclined portion 27 has the pair of ends along reference axis M; and the pair of ends include end 27b that is farther from first end 9a and is located to overlap with tubular body portion 19 along reference axis M.

Since the inner diameter of end 27b of inclined portion 27 farther from first end 9a is the smallest in inclined portion 27, when rack bar 8 is deflected in the radial direction, rack bar 8 contacts the end 27b. At the moment, the load from rack bar 8 is not applied to stroke restricting portion 25 but applied to tubular body portion 19, thereby suppressing the occurrence of tensile stress on outer peripheral edge portion 25c of stroke restricting portions 25. This serves to suppress cracks in outer peripheral edge portion 25c of stroke restricting portion 25.

Figure 7:
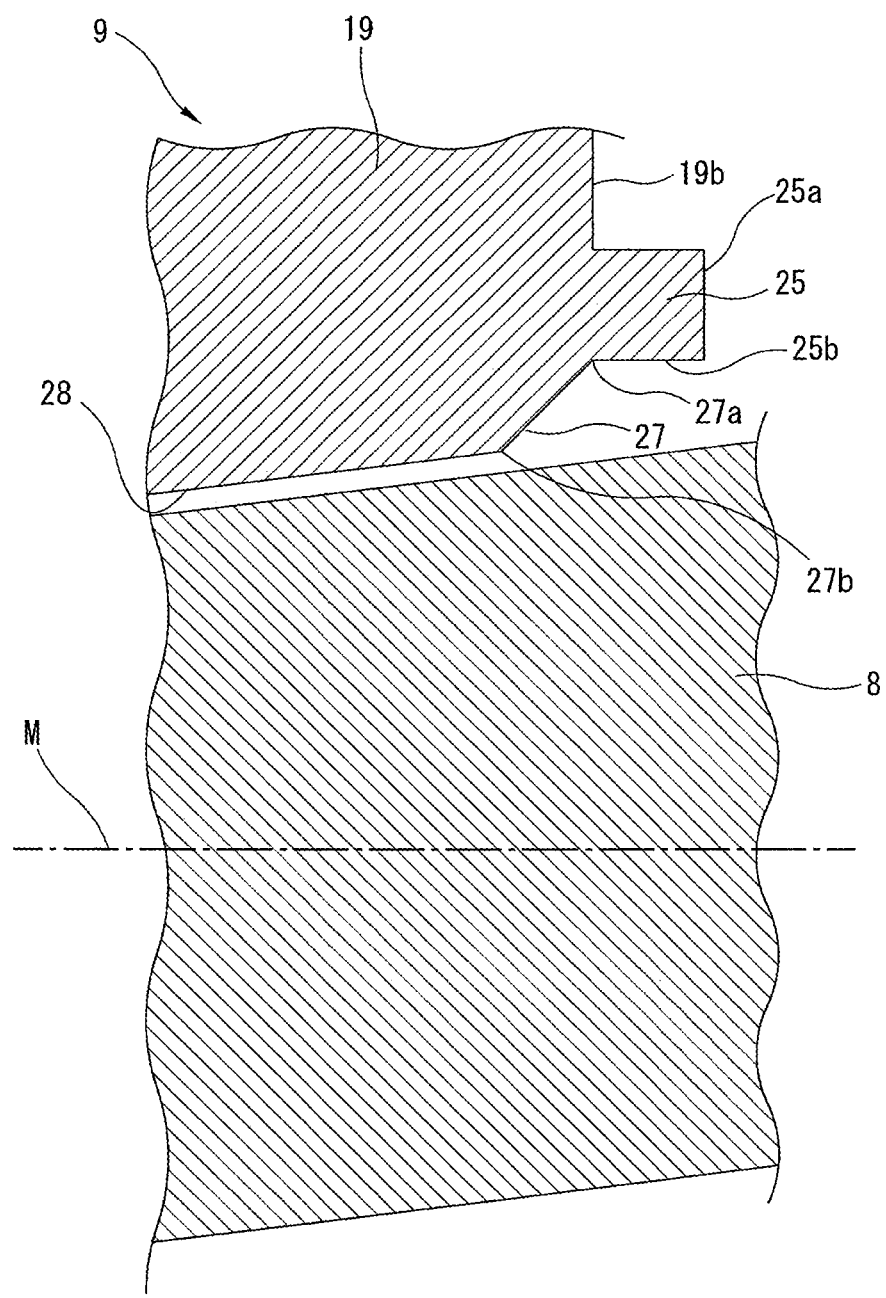
FIG. 7 is an enlarged sectional view of a rack bar and a rack housing according to a third embodiment at its first end.

<Third Embodiment> FIG. 7 is an enlarged sectional view of rack bar 8 and rack housing 9 according to a third embodiment at first end 9a (see FIG. 1). FIG. 7 shows a situation that rack bar 8 is deflected in the radial direction with respect to rack housing 9, i.e. a situation that rack bar 8 is inclined with respect to reference axis M.

In the third embodiment, tubular body portion 19 includes an inclined portion 28 in addition to inclined portion 27 as in the second embodiment similar, wherein inclined portion 28 is adjacent to inclined portion 27, and inclined conically. Inclined portion 27 and inclined portion 28 are located to overlap with tubular body portion 19 along reference axis M. In other words, inclined portion 27 and inclined portion 28 extend in the region of tubular body portion 19 in the axial direction.

Inclined portion 28 has a shape fitted to a deflected shape of rack bar 8 in contact with the inner peripheral surface of tubular body portion 19. In this embodiment, inclined portion 28 is inclined such that the inner diameter of tubular body portion 19 gradually increases toward first contact portion 25a.

<Effects of Third Embodiment> In the third embodiment, inclined portion 28 has a shape fitted to a deflected shape of rack bar 8 in contact with the inner peripheral surface of tubular body portion 19.

With the formation of inclined portion 28, when rack bar 8 is deflected in the radial direction, rack bar 8 follows inclined portion 28, and contacts an obtuse corner (end 27b) formed between inclined portion 27 and inclined portion 28. This further suppresses rack bar 8 and tubular body 19 from locally contacting each other. This serves to reduce the load applied to tubular body 19, and also suppress a load from being applied to stroke restricting portion 25 adjacent to tubular body portion 19.

Figure 8:
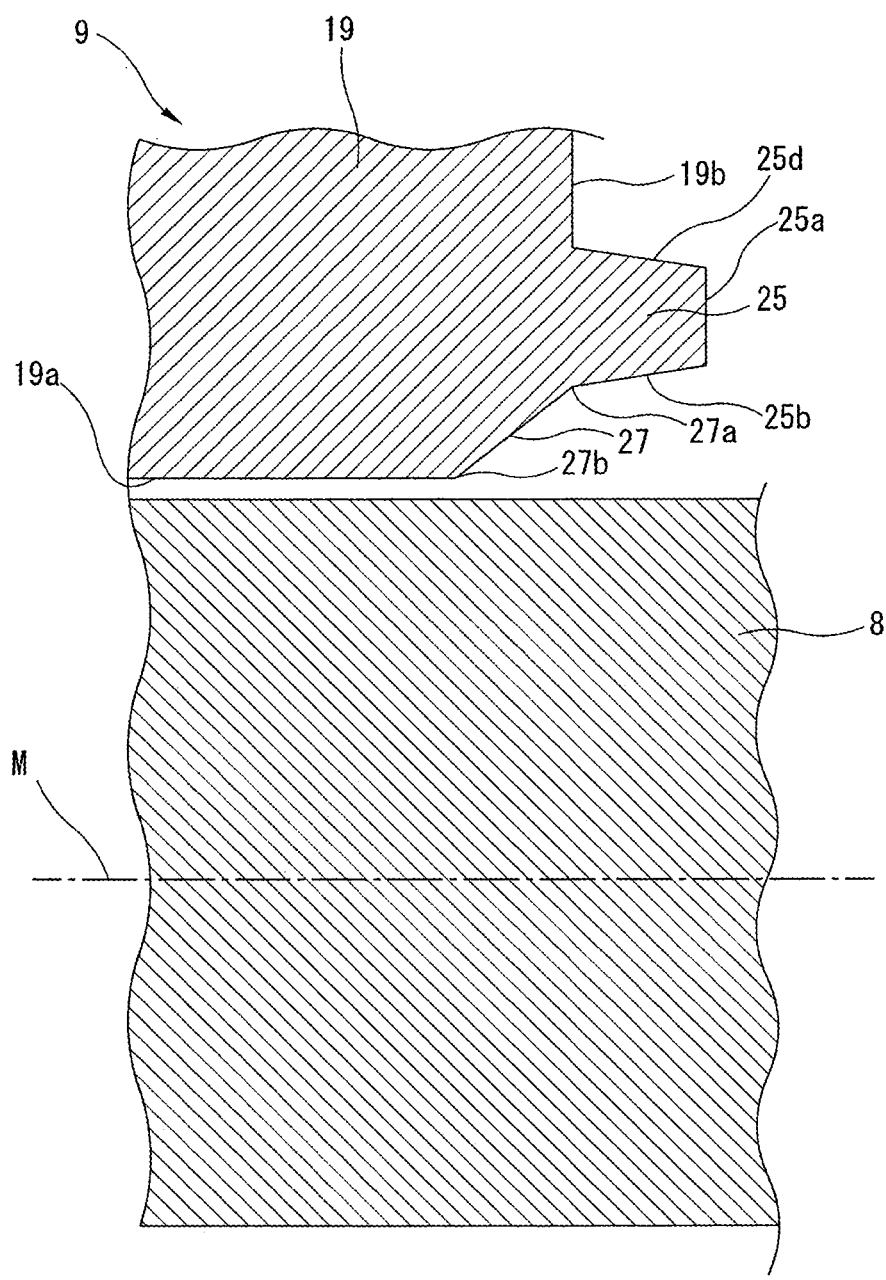
FIG. 8 is an enlarged sectional view of a rack bar and a rack housing according to a fourth embodiment at its first end.

<Fourth Embodiment> FIG. 8 is an enlarged sectional view of rack bar 8 and rack housing 9 according to a fourth embodiment at first end 9a (see FIG. 1).

In the fourth embodiment, tubular body portion 19 is provided with supporting surface 19a and inclined portion 27 as in the second embodiment, but the fourth embodiment is different in shape of stroke restricting portion 25.

In the axial sectional plane containing the reference axis M, stroke restricting portion 25 is tapered to have a radial thickness as a dimension in the radial direction such that the radial thickness decreases gradually from tubular body portion 19 toward first end 9a. In other words, stroke restricting portion 25 protrudes annularly from tubular body portion 19 such that inner peripheral surface 25b and outer peripheral surface 25d of stroke restricting portion 25 approach each other toward first contact portion 25a. The shape of stroke restricting portion 25 is formed by cutting the inner peripheral surface 25b and outer peripheral surface 25d by machining.

Incidentally, the tapered shape of stroke restricting portion 25 may be formed by a draft angle of a casting mold, for example.

<Effects of Fourth Embodiment> In the fourth embodiment: in the sectional plane containing the reference axis M, stroke restricting portion 25 has a radial thickness as a dimension in the radial direction with respect to reference axis M; and the radial thickness decreases gradually from tubular body portion 19 to first end 9a.

The feature that the radial thickness of stroke restricting portion 25 decreases, results in that stroke restricting portion 25 has a root portion thicker than a tip portion, namely, than first contact portion 25a. When first rack end 10 collides with inner peripheral surface 25b of stroke restricting portion 25, this feature serves to suppress the root portion of stroke restricting portion 25 from receiving a concentrated internal stress, and thereby suppress stroke restricting portion 25 from being damaged.

Figure 9:
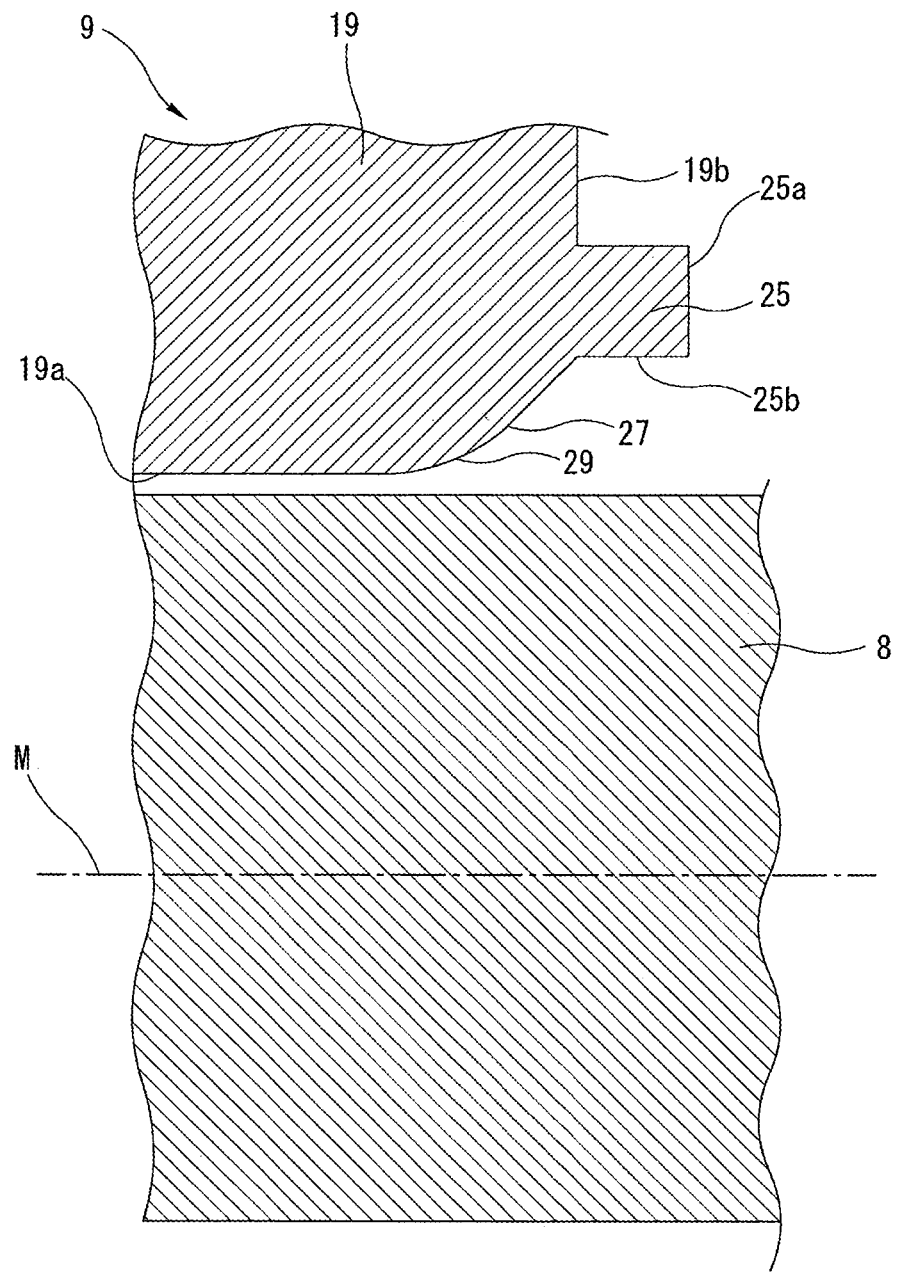
FIG. 9 is an enlarged sectional view of a rack bar and a rack housing according to a fifth embodiment at its first end.

<Fifth Embodiment> FIG. 9 is an enlarged sectional view of rack bar 8 and rack housing 9 according to a fifth embodiment at first end 9a (see FIG. 1).

In the fifth embodiment, tubular body portion 19 of rack housing 9 includes an inner peripheral surface shaped to be smoothly continuous in a region from tubular body portion 19 to inclined portion 27 in the axial direction in the axial sectional plane containing the reference axis M. Namely, supporting surface 19a of tubular body portion 19 and inclined portion 27 are smoothly connected by an arcuate surface 29.

<Effects of Fifth Embodiment> In the fifth embodiment, rack housing 9 includes the inner peripheral surface shaped to be smoothly continuous in the region from tubular body portion 19 to inclined portion 27 along reference axis M in the sectional plane containing the reference axis M.

If arcuate surface 29 is not provided, the corner between supporting surface 19a and inclined portion 27 may receive a concentrated stress.

However, the feature of the fifth embodiment that arcuate surface 29 is provided, serves to suppress the corner between supporting surface 19a and inclined portion 27 from receiving a concentrated stress.

The steering devices according to the embodiments described above may be exemplified as follows.

According to one aspect, a steering device includes: a rack bar connected to a pair of ball joints, wherein the pair of ball joints include a first ball joint and a second ball joint; a rack housing made of metal, and including a tubular body portion, a cushioning member accommodating portion, a stroke restricting portion, and a pair of ends, wherein the pair of ends include a first end and a second end, wherein: the tubular body portion is structured to support the rack bar in a manner to allow the rack bar to travel; with reference to a reference axis that is parallel to a direction of travel of the rack bar with respect to the rack housing, and passes through a center of a circle in a cross-sectional plane perpendicular to the direction of travel of the rack bar, wherein the circle is defined by an inner peripheral surface of the tubular body portion, the cushioning member accommodating portion is disposed to be closer to the first end than the tubular body portion along the reference axis, and be outside the rack bar in a radial direction with respect to the reference axis, and has a recessed shape opening to the first end along the reference axis; the stroke restricting portion is disposed inside the cushioning member accommodating portion in the radial direction with respect to the reference axis; along the reference axis, the stroke restricting portion overlaps with the cushioning member accommodating portion, and is closer to the first end than the tubular body portion, and projects toward the first end, and includes a first contact portion structured to be in contact with the first ball joint; and the stroke restricting portion has an inner diameter as a dimension in the radial direction with respect to the reference axis, wherein the inner diameter is greater than a minimum value of inner diameter of the tubular body portion as a dimension in the radial direction with respect to the reference axis; and a cushioning member disposed at the cushioning member accommodating portion, and made of an elastic material, and including a cushioning portion, wherein: the cushioning member is structured to be compressed between the tubular body portion and the first ball joint, and includes a second contact portion structured to be in contact with the first ball joint; and the second contact portion is closer to the first end than the first contact portion along the reference axis.

In a preferred aspect, the steering device is configured such that: the rack housing includes an inclined portion; and the inclined portion is formed in a region from the tubular body portion to the stroke restricting portion along the reference axis such that an inner diameter of the rack housing that is a dimension in the radial direction with respect to the reference axis increases gradually toward the first contact portion.

In another preferred aspect, the steering device is configured such that the inclined portion has a shape fitted to a deflected shape of the rack bar in contact with the inner peripheral surface of the tubular body portion.

In another preferred aspect, the steering device is configured such that: the inclined portion has a pair of ends along the reference axis; and the pair of ends include an end that is farther from the first end and is located to overlap with the tubular body portion along the reference axis.

In another preferred aspect, the steering device is configured such that: the rack housing is a casting formed by casting; and the inclined portion has a casting surface.

In another preferred aspect, the steering device is configured such that: the rack housing is a casting formed by casting; and the cushioning member accommodating portion, the stroke restricting portion, and the inclined portion are of an article integrally formed with a single casting mold.

In another preferred aspect, the steering device is configured such that: in a sectional plane containing the reference axis, the stroke restricting portion has a radial thickness as a dimension in the radial direction with respect to the reference axis; and the radial thickness decreases gradually from the tubular body portion to the first end.

In another preferred aspect, the steering device is configured such that the rack housing includes an inner peripheral surface shaped to be smoothly continuous in a region from the tubular body portion to the inclined portion along the reference axis in a sectional plane containing the reference axis.

In another preferred aspect, the steering device is configured such that the rack housing includes an inner peripheral surface including a supporting surface structured to support the rack bar directly.

The invention claimed is:
1. A steering device comprising:
a rack bar connected to a pair of ball joints, wherein the pair of ball joints include a first ball joint and a second ball joint;
a rack housing made of metal, and including a tubular body portion, a cushioning member accommodating portion, a stroke restricting portion, and a pair of ends, wherein the pair of ends include a first end and a second end, wherein:
the tubular body portion is structured to support the rack bar in a manner to allow the rack bar to travel;
with reference to a reference axis that is parallel to a direction of travel of the rack bar with respect to the rack housing, and passes through a center of a circle in a cross-sectional plane perpendicular to the direction of travel of the rack bar, wherein the circle is defined by an inner peripheral surface of the tubular body portion,
the cushioning member accommodating portion is disposed to be closer to the first end than the tubular body portion along the reference axis, and be outside the rack bar in a radial direction with respect to the reference axis, and has a recessed shape opening to the first end along the reference axis;
the stroke restricting portion is disposed inside the cushioning member accommodating portion in the radial direction with respect to the reference axis;
along the reference axis, the stroke restricting portion overlaps with the cushioning member accommodating portion, and is closer to the first end than the tubular body portion, and projects toward the first end, and includes a first contact portion structured to be in contact with the first ball joint; and
the stroke restricting portion has an inner diameter as a dimension in the radial direction with respect to the reference axis, wherein the inner diameter is greater than a minimum value of inner diameter of the tubular body portion as a dimension in the radial direction with respect to the reference axis; and
a cushioning member disposed at the cushioning member accommodating portion, and made of an elastic material, and including a cushioning portion, wherein:
the cushioning member is structured to be compressed between the tubular body portion and the first ball joint, and includes a second contact portion structured to be in contact with the first ball joint; and
the second contact portion is closer to the first end than the first contact portion along the reference axis,
wherein:
the rack housing includes an inclined portion; and
the inclined portion is formed in a region from the tubular body portion to the stroke restricting portion along the reference axis such that an inner diameter of the rack housing that is a dimension in the radial direction with respect to the reference axis increases gradually toward the first contact portion.

2. The steering device as claimed in claim 1, wherein the inclined portion has a shape fitted to a deflected shape of the rack bar in contact with the inner peripheral surface of the tubular body portion.

3. The steering device as claimed in claim 1, wherein:
the inclined portion has a pair of ends along the reference axis; and
the pair of ends include an end that is farther from the first end and is located to overlap with the tubular body portion along the reference axis.

4. The steering device as claimed in claim 1, wherein:
the rack housing is a casting formed by casting; and
the inclined portion has a casting surface.

5. The steering device as claimed in claim 1, wherein:
the rack housing is a casting formed by casting; and
the cushioning member accommodating portion, the stroke restricting portion, and the inclined portion are of an article integrally formed with a single casting mold.

6. The steering device as claimed in claim 1, wherein:
in a sectional plane containing the reference axis, the stroke restricting portion has a radial thickness as a dimension in the radial direction with respect to the reference axis; and
the radial thickness decreases gradually from the tubular body portion to the first end.

7. The steering device as claimed in claim 1, wherein the rack housing includes an inner peripheral surface shaped to be smoothly continuous in a region from the tubular body portion to the inclined portion along the reference axis in a sectional plane containing the reference axis.

8. The steering device as claimed in claim 1, wherein the rack housing includes an inner peripheral surface including a supporting surface structured to support the rack bar directly.

9. A steering device comprising:
a rack bar connected to a first ball joint and a second ball joint;
a rack housing including:
a tubular body portion configured to support the rack bar such that the rack bar is movable relative to the tubular body portion along an axial direction of the rack housing,
a first end,
a second end,
a cushion member accommodating extension extending from the tubular body portion towards the first end along the axial direction, and
a stroke restricting extension extending from the tubular body portion, positioned axially inward relative to the first end, and positioned axially overlapping with and radially inward relative to the cushion member accommodating extension, wherein:
the stroke restricting extension includes a first contact portion structured to be in contact with the first ball joint; and
the stroke restricting extension has an inner diameter greater than a minimum inner diameter of the tubular body portion; and
an elastic cushion disposed adjacent the cushion member accommodating extension, wherein:
the cushion is compressible between the tubular body portion and the first ball joint, and includes a second contact portion structured to be in contact with the first ball joint; and
the second contact portion is closer to the first end than the first contact portion along the axial direction,
wherein the rack housing further includes an inclined portion formed in a region from the tubular body portion to the stroke restricting extension along the axial direction such that an inner diameter of the rack housing increases along the axial direction toward the first contact portion.

\* \* \* \* \*